United States Patent [19]

Okuyama et al.

[11] Patent Number: 4,769,104
[45] Date of Patent: Sep. 6, 1988

[54] APPARATUS FOR STICKING A TIRE COMPONENT MEMBER

[75] Inventors: Kouji Okuyama, Kawagoe; Makoto Yamamoto, Akikawa; Hiroki Touya, Kodaira, all of Japan

[73] Assignee: Bridgestone Corporation, Tokyo, Japan

[21] Appl. No.: 114,987

[22] Filed: Oct. 30, 1987

[30] Foreign Application Priority Data

Nov. 11, 1986 [JP] Japan .................. 61-262760

[51] Int. Cl.⁴ .................. B29C 65/78; B29C 63/30
[52] U.S. Cl. .................................................. 156/406.4
[58] Field of Search ................... 156/405.1, 406.4, 411

[56] References Cited

U.S. PATENT DOCUMENTS

| | | | |
|---|---|---|---|
| 1,734,242 | 11/1929 | Wikle | 156/405.1 |
| 1,762,752 | 6/1930 | Abbott | 156/405.1 |
| 3,413,174 | 11/1968 | Porter | 156/405.1 |
| 4,080,230 | 3/1978 | Batchelor | 156/405.1 |
| 4,222,811 | 9/1980 | Enders | 156/405.1 |
| 4,409,872 | 10/1983 | Bertoldo | 156/405.1 |
| 4,411,724 | 10/1983 | Ito et al. | 156/405.1 |
| 4,457,802 | 7/1984 | Yamagihara et al. | 156/405.1 |
| 4,470,866 | 9/1984 | Satoh et al. | 156/411 |
| 4,596,617 | 6/1986 | Ishii | 156/406.4 |
| 4,617,074 | 10/1986 | Portalupi et al. | 156/412 |

FOREIGN PATENT DOCUMENTS

| | | |
|---|---|---|
| 57-105336 | 6/1982 | Japan . |
| 58-38143 | 3/1983 | Japan . |
| 58-38144 | 3/1983 | Japan . |
| 59-55773 | 3/1984 | Japan . |
| 59-207227 | 11/1984 | Japan . |
| 60-54841 | 3/1985 | Japan . |
| 60-79938 | 5/1985 | Japan . |
| 62-11633 | 1/1987 | Japan . |
| 62-11634 | 1/1987 | Japan . |
| 62-11635 | 1/1987 | Japan . |

Primary Examiner—Willard Hoag
Attorney, Agent, or Firm—Sughrue, Mion, Zinn, Macpeak & Seas

[57] ABSTRACT

An apparatus for sticking a tire component member (a cord cloth with rubber) having cords inserted therein at a predetermined bias angle and having its opposite ends cut respectively in parallel to the cords into a fixed length onto a forming drum upon manufacturing a rubber tire. This apparatus comprises a belt conveyor containing attracting means therein for receiving the cut tire component member and conveying it to the forming drum, widthwise positioning means for correcting a position in the widthwise direction of the tire component member on the belt conveyor by holding the tire component member from its both lateral sides, and front end and rear end reshaping means adapted to butt against cut edge surfaces at the front end and the rear end of the tire component member for correcting the shapes of these cut edges. Since positioning and front and rear end reshaping of the tire component member are effected on the belt conveyor, when the tire component member has been sticked onto the forming drum, the front end and the rear end of the tire component member can be aligned at a high precision, and so, the quality of the finished tire can be improved. The sticking step for the tire component member can be perfectly automated and a production efficiency can be raised.

9 Claims, 9 Drawing Sheets

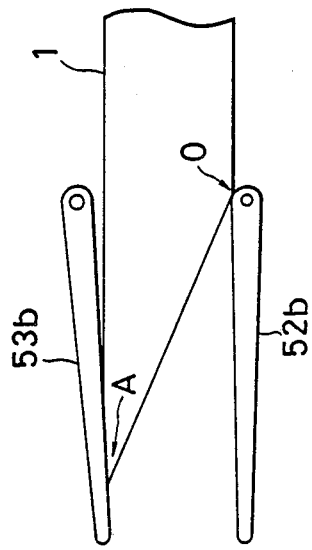 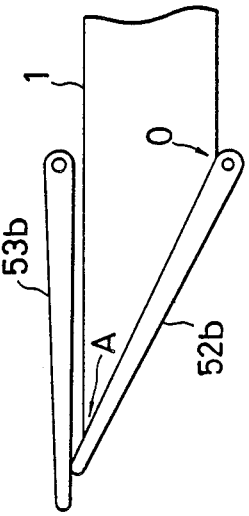

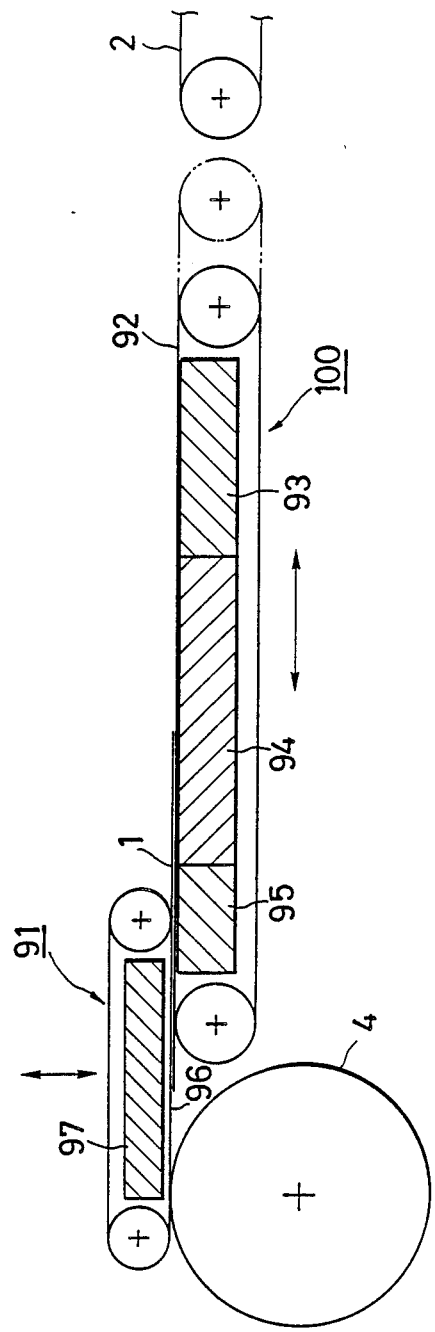

APPARATUS FOR STICKING A TIRE COMPONENT MEMBER

BACKGROUND OF THE INVENTION

The present invention relates to an apparatus for sticking a cord cloth coated with rubber having cords inserted therein at a predetermined bias angle (a belt member) which forms one constituent member of a tire onto a forming drum upon manufacturing a rubber tire.

In general, a belt member serving as a tire constituent member is cut at its opposite ends in parallel to cords into a fixed length, and it is formed into an elongated parallelogram. When a tire is manufactured, this belt member is stuck onto a forming drum and its front and read ends are joined. In the prior art, the belt member was simply wound around a circumferential surface of a forming drum while its length in the longitudinal direction was being stretched appropriately so that when winding was finished its front and rear ends might align with each other.

However, upon cutting a belt member, in some case it may occur that a cut edge does not form a straight line, a tilt angle of the cut edge has a distribution, and hence even if it is attempted to stick a belt member onto a forming drum simply while it is being stretched and to join the cut edges at the front and rear ends with each other into a joint, it is fairly possible that a gap on clearance may arise partially or deviation and overlapping may occur.

More particularly, as shown in FIGS. 8a to 8e there may possibly occur inconveniences such that tilt angles of cut edges of front and rear ends of a belt member 01 do not coincide with each other (FIG. 8a), that deviation of a center line arises (FIG. 8b), that partly a gap clearance exists (FIG. 8c), that end portions overlap with each other (FIG. 8d), that end portions are perfectly apart from each other, and the like, and if the belt member is used with its cut edges improperly jointed, the manufactured tire would have deteriorated quality and performance or would become unsuitable for use. Accordingly, it was difficult to automate the process of sticking a belt member onto a forming drum.

SUMMARY OF THE INVENTION

The present invention has been worked out in view of the above-mentioned points, and one object of the invention is to provide an apparatus for sticking a tire component member in which positioning of an entire belt member and correction of distribution of cut edges at the front and rear ends of the belt member are performed automatically and jointing of the cut edges at a high precision is made possible.

According to the present invention, there is provided an apparatus for sticking a tire component member having cords inserted therein at a predetermined bias angle and having its opposite ends cut respectively in parallel to the cords into a fixed length, onto a forming drum, comprising a belt conveyor containing attracting means therein for receiving the cut tire component member and conveying it to the forming drum, widthwise positioning means for correcting a position in the widthwise direction of the tire component member on the belt conveyor by holding the tire component member from its both lateral sides, front end reshaping means adapted to butt against a cut edge surface at the front end of the tire component member on the belt conveyor for correcting the shape of the front cut edge, and rear end reshaping means adapted to butt against a cut edge surface at the rear end of the tire component member on the belt conveyor for correcting the shape of the rear cut edge.

On the belt conveyor, since the tire component member has its position in the widthwise direction corrected by the widthwise positioning means, has its shapes at the front end and at the rear end corrected by the front end reshaping means and the rear end reshaping means, respectively, and is conveyed to the forming drum while its corrected position and corrected shapes are maintained by the attracting means, this tire component member can be stuck onto the forming drum with its cut edges at the front end and at the rear end aligned at a high precision.

BRIEF DESCRIPTION OF THE DRAWINGS

FIGS. 5a and 5b are schematic views for explaining a method for correcting a front end shape;

FIG. 7 is a schematic side view showing another preferred embodiment of the present invention.

DETAILED DESCRIPTION OF THE PREFERRED EMBODIMENTS

In the following, at first the present invention will be described in connection to one preferred embodiment of the invention illustrated in FIGS. 1 to 6. A belt member 1 forming one tire component member is a cord cloth with rubber having steel wires inserted therein at a fixed bias angle, and it has an elongated parallelogram shape having its front end and rear end cut in parallel to the above-mentioned steel wires.

Figure 1:
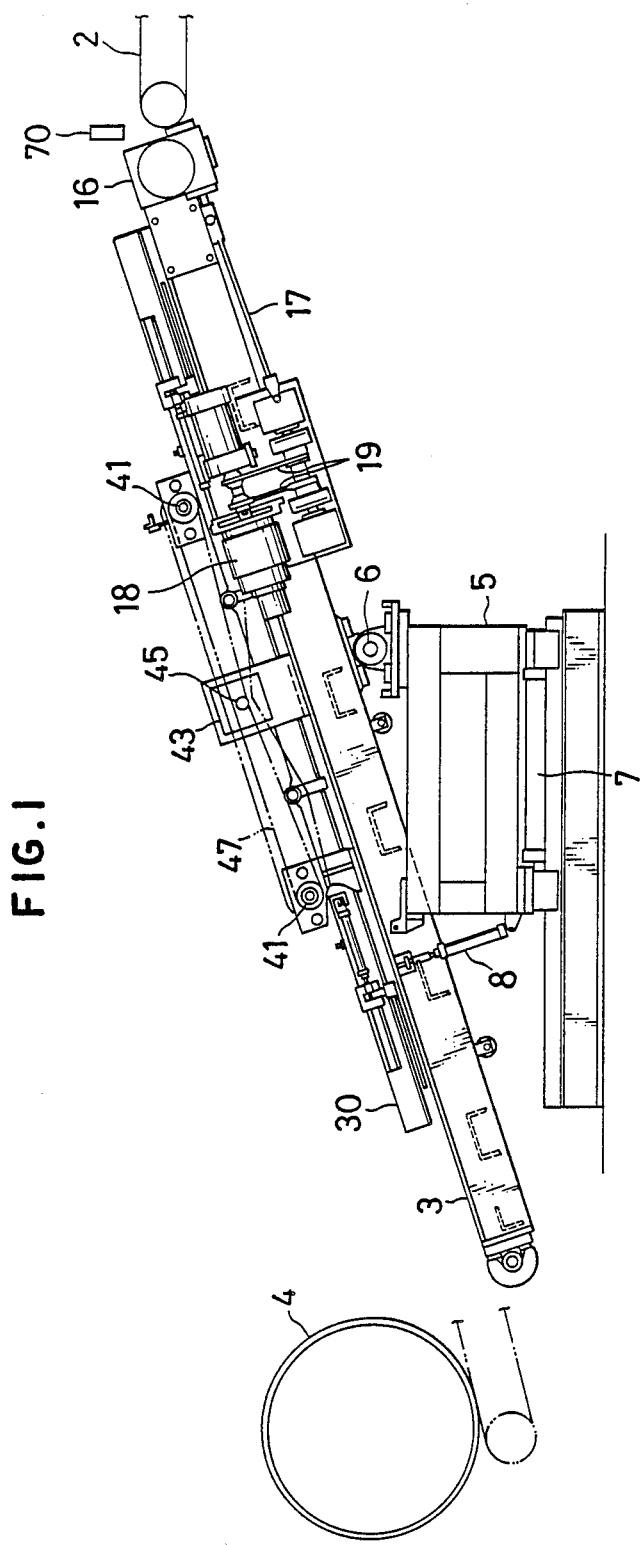
FIG. 1 is a side view of a sticking apparatus according to one preferred embodiment of the present invention.

FIG. 1 is a side view of a sticking apparatus, in which a belt member is transferred from a fixed length cutting conveyor 2 on the right onto a belt conveyor 3 in the condition cut into a fixed length, and after it has been corrected in position and shape on that belt conveyor 3, it is conveyed to a forming drum 4 and is wound around and stuck to the forming drum 4.

The belt conveyor 3 has its central portion pivotably supported via a horizontal support shaft 6 directed in the left and right directions on a base table 5 which can slide in the back and forth directions as driven by an advancing and retreating cylinder 7, has its front portion supported via a swinging cylinder 8, and is inclined in the forward and downward direction. Accordingly, the belt conveyor 3 can slide in the forward and backward directions as driven by the advancing and retreating cylinder 7 and also can swing about the support shaft 6 as driven by the swinging cylinder 8. At first, the belt conveyor 3 comes close to the fixed length cutting conveyor 2 and is fed with the belt member 1. When it moves forward and its front end has come under the forming drum 4, it stops, then the front end portion is made to swing upward to be pressed lightly against the forming drum. The belt member 1 on the belt conveyor 3 is stuck onto the forming drum 4.

Figure 2:
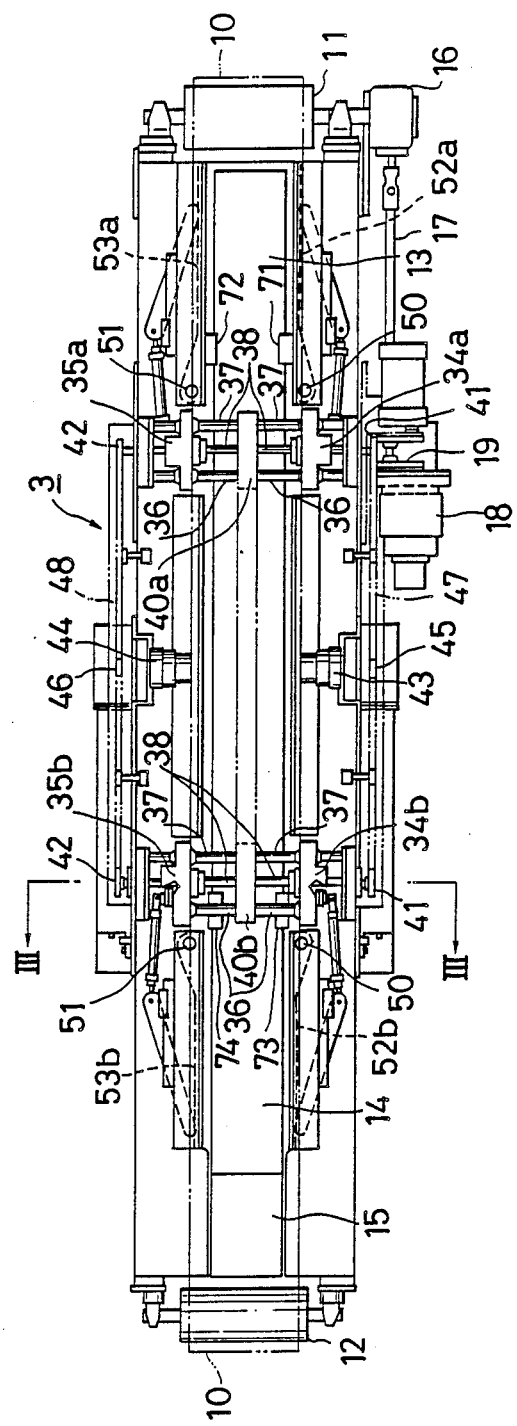
FIG. 2 is a plan view of the same.
Figure 3:
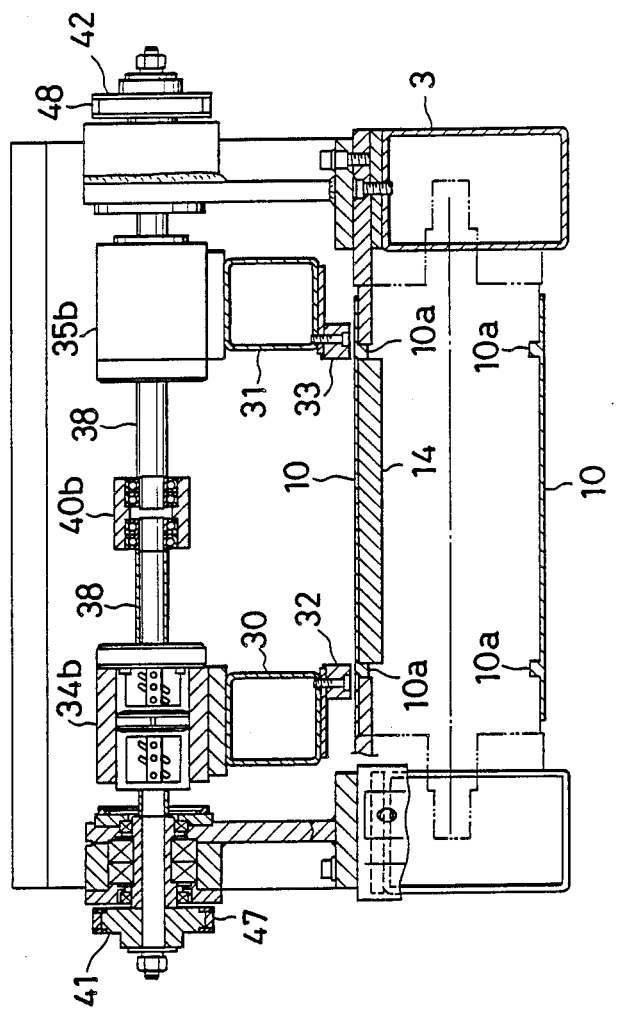
FIG. 3 is a cross-section view taken along line III—III in FIG. 2.

FIG. 2 is a plan view of the belt conveyor 3, and FIG. 3 is a cross-section view taken along line III—III in FIG. 2. The belt conveyor 3 includes an elongated conveyor belt 10 linked between pulleys 11 and 12. On an inside surface of the conveyor belt 10, two projected stripes 10a extending in the lengthwise direction are provided. On the underside of the upper traveling portion of the conveyor belt 10 are arranged rectangular electromagnets 13, 14 and 15 respectively at the rear, central and front positions, and zig-zag movement of the belt upon traveling is prevented by the provision such that the above-mentioned projected stripes 10a may hold the electromagnets 13, 14 and 15 therebetween. It is to be noted that for the conveyor belt 10, a belt having such configuration and properties that it can hardly adhere tightly to the belt member 1 having a high coefficient of friction, is chosen.

The rear pulley 11 is connected to a motor 18 through a gear mechanism 16 consisting of a worm and a worm-wheel, a drive shaft 17 and a belt 19, and it is driven by motor 18.

At the central portion of the belt conveyor 3, centering arms 30 and 31 are provided at positions on the opposite sides of the conveyor belt 10 as supported from the above along the traveling direction of the belt. To the bottom surfaces of the centering arms 30 and 31 are fixedly secured centering bars 32 and 33, respectively, and the centering bars 32 and 33 are held close to the upper surface of the conveyor belt 10. To the rear portions and front portions of the centering arms 30 and 31 are fixedly secured slide support members 34a, 34b and 35a, 35b, respectively. The respective slide support members are supported as slidably penetrated by shafts 36 and 37, respectively, which are mounted on a base frame as directed in the left and right directions.

In addition, the respective slide support members are threadedly engaged with ball screws 38, 38, respectively. The ball screws 38 project from the respective slide support members 34 and 35 on the inside and outside, and their inside end portions are rotatably supported by receiver members 40a and 40b. At the outside end portions of the ball screws 38, 38 fixed pulleys 41 and 42, respectively are placed with belts 47 and 48 linked between pulleys 45, 46 provided on output shafts of motors 43, 44 disposed at the central portion of the belt conveyor 3. The above-mentioned pulleys 41, 42 in response to rotation of the motors 43 and 44, use the ball screws 38, 38 to rotate and the slide support members 34 and 35 move in the left and right directions. At the same time, the centering arms 30 and 31 and the centering bars 32 and 33 also move in the left and right directions, and the centering bars 32 and 33 hold the belt member 1 on the conveyor belt 10 from the opposite sides to perform positioning in the widthwise direction of the belt member 1.

At the rear end and the front end of the centering arms 30 and 31, are disposed correcting arms 52a, 52b, 53a and 53b which are pivotably supported and swingable in the horizontal directions (FIG. 2).

Figure 4:
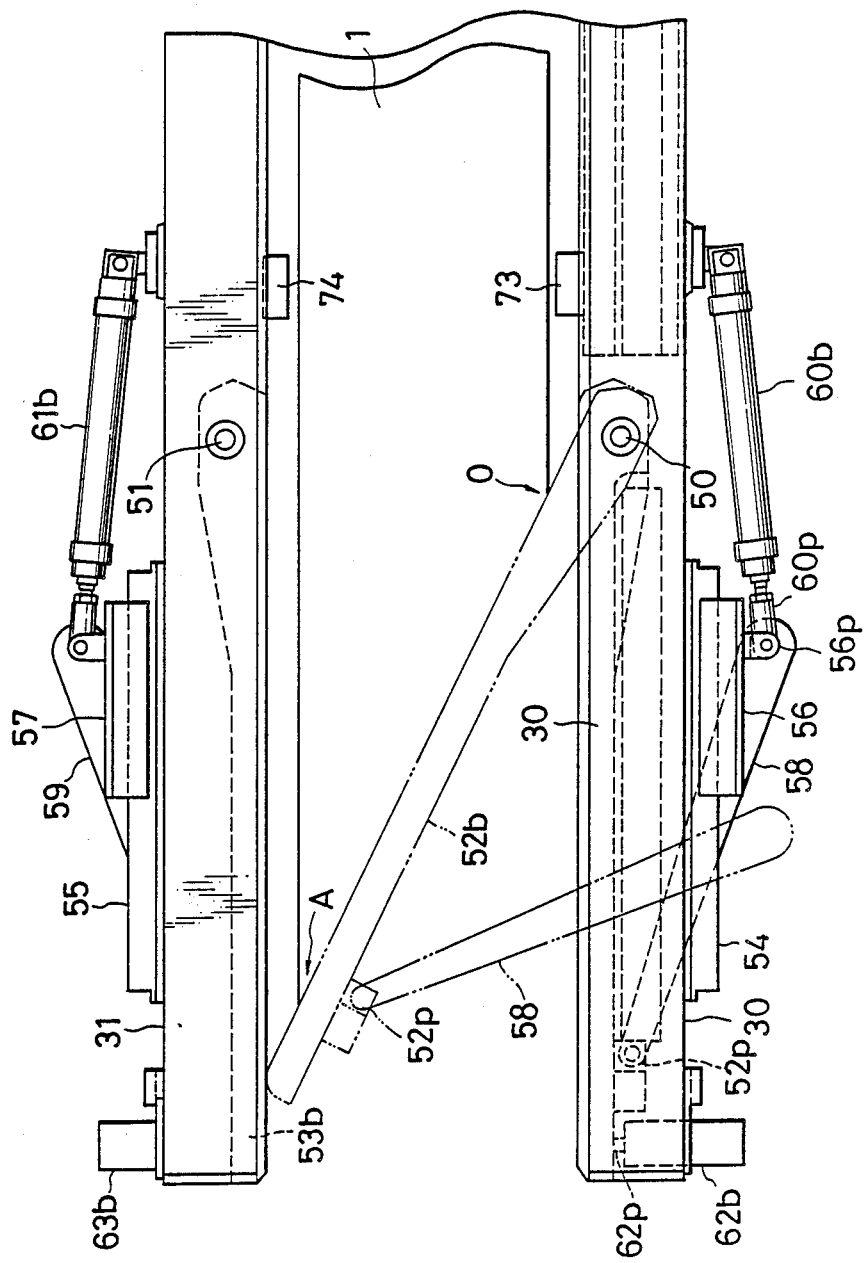
FIG. 4 is a plan view showing a front end reshaping mechanism in the sticking apparatus in FIGS. 1 to 3.

The operation mechanisms for these correction arms will now be explained with respect to the correcting arm 52b at the front end on the left side with reference to FIG. 4. On the outside surface at the front end portion of the centering arm 30 is fixedly disposed a slide rail 54 as directed in the back and forth directions, and a slider 56 is slidably fitted to the slide rail 54. One end of a link member 58 is pivotably mounted to a projection 56p provided on the slider 56, and the other end of the same link member 58 is pivotably mounted to a projection 52p provided in the proximity of the tip end of the above-described correcting arm 52b. To the above-described projection 56p is also pivotably mounted a piston 60p of a cylinder 60b. The base end portion of that cylinder 60b is pivotably mounted to an outside surface of the centering arm 30. If the cylinder 60b operates and its piston 60p projects forwards, then the slider 56 slides forwards along the slide rail 54, the base end portion of the link member 58 moves jointly with the slider 56 and makes the correcting arm 52b rotate about the pin. Accordingly, the tip end portion of the correcting arm 52b moves towards the center line of the conveyor belt. When the piston 60p has perfectly retreated into the cylinder 60b, a side surface of the correcting arm 52b would align with the side surface of the above-mentioned centering bar 32. The correcting arm 52b swings a little also in response to a piston 62p of a cylinder 62b provided at the front end portion of the centering arm 30 projecting. Thus, the front end portion of the centering arm 30 can be pushed out towards the center line of the belt.

At the tip end portion of the centering arm 31 on the right side is also provided an operation mechanism for the correcting arm 53b that is quite similar to the operation mechanism.

Now, a method for reshaping (i.e., correcting the shape of) the front end of the belt member 1 by means of the correcting arms 52b and 53b, will be explained with reference to FIGS. 5a and 5b. The belt member 1 advances jointly with the conveyor belt 10 while it is attracted to the upper surface of the conveyor belt 10 by magnetic forces of the above-described electromagnets 13, 14 and 15, and stops at a predetermined position. The front end of the belt member 1 is cut obliquely in parallel to the cords as described above. The correcting arm 52b is placed at the position faced to this oblique cut edge, and the correcting arm 53b is placed at the position faced to a straight edge portion of the belt member 1 that forms an acute angle with the cut edge. Between the correcting arms 52b and 53b and the respective side edges of the belt member 1 are respectively maintained predetermined gap clearances.

At first, the correcting arm 53b on the side of the straight edge portion swings by an angle less than 5 degrees as pushed by a cylinder 63b, and thereby an acute angle portion A at the tip end of the belt member 1 is somewhat pushed to the inside (FIG. 5a). In this way, correction can be made in case that upon cutting, the tip end acute angle portion A was projected outside to more than a necessary extent.

Subsequently, after the correcting arm 53b has been returned again to its original position, the correcting arm 52b is made to swing inside up to a predetermined angle now by actuating the cylinder 60b. By knocking the front end cut edge surface of the belt member 1, the cut edge surface is aligned at the above-mentioned predetermined angle. Since the correcting arm 52b stops swinging at the moment when its front end butts against the correcting arm 53b, by adjusting the interval between the respective correcting arms 30 and 31 to which the correcting arms 52b and 53b are respectively mounted, the swinging angle of the correcting arms 52b can be adjusted to the above-described predetermined angle.

While a description has been made above with respect to reshaping of the front end of the belt member 1, reshaping of the rear end is also carried out by the correcting arms 52a and 53a in a manner similar to the above.

In the belt conveyor 3, photo-sensors for detecting the conveying condition of the belt member 1 are disposed at predetermined positions. More particularly, as shown in FIG. 1, a rear end sensor 70 is disposed at a transfer station from the fixed length cutting conveyor 2 to the belt conveyor 3, as shown in FIG. 2 at predetermined positions in the proximity of the rear ends of the centering arms 30 and 31 are disposed rear end obtuse angle portion sensors 71 and 72 as projecting towards the center line. Likewise, in the proximity of the front ends of the centering arms 30 and 31 are disposed front end obtuse angle portion sensors 73 and 74. The rear end sensor 70 detects that the rear end of the belt member 1 has passed and confirms that the belt member has been fed to the conveyor. In response to this confirmation the conveyor 3 is stopped, and after centering of the belt member 1 has been performed by the centering bars 32 and 33, the conveyor 3 advances again. The rear end obtuse angle portion detectors 71 and 72 detect the passage of the rear end obtuse angle portion of the belt member 1, and they are utilized as a reference for the stop position of the belt member 1 for carrying out correction of the rear end shape of the belt member 1. Likewise, the front end obtuse angle portion sensors 73 and 74 detect the passage of the front end obtuse angle portion, and they are utilized as a reference for the stop position of the belt member 1 for carrying out correction of the front end shape of the belt member 1.

The belt member sticking apparatus constructed in the above-described manner is driven as controlled by a control system not shown, and the procedure of the operation will be explained with reference to the schematic cross-section views in FIGS. 6a to 6g. These figures illustrate a series of operation steps in sequence.

First, a belt member 1 cut into a fixed length is fed from the fixed length cutting conveyor 2 to the belt conveyor 3, and when a predetermined period has elapsed after the rear end sensor 70 detected the rear end of the belt member 1, the motor 18 is stopped, and thereby the conveyor belt 10 is stopped. At this moment, the rear end acute angle portion sensors 71 and 72 have not yet detected the rear end obtuse angle portion of the belt member 1, and the belt member 1 stops at the position shown in FIG. 6a.

Then the motors 43 and 44 are actuated to bring the left and right centering arms 30 and 31 up to predetermined positions, so that the centering bars 32 and 33 hold the belt member 1 from the left and right sides. Thus, positioning in the widthwise direction is achieved. When the positioning in the widthwise direction has been done, the electromagnets 13, 14 and 15 are strongly excited to attract the belt member 1 positioned in the widthwise direction to the conveyor belt 10 and thereby fix the belt member 1 so as not to slip off. Thereafter, the centering arms 30 and 31 are moved outwardly apart from each other for detection of the belt member 1 by the rear end obtuse angle sensors 71 and 72.

Figure 6A:
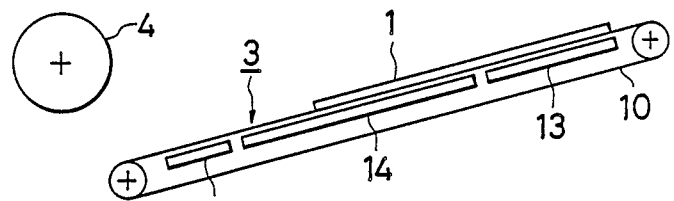
FIGS. 6a to 6g are schematic cross-section views illustrating successive operation steps in the same sticking apparatus.
Figure 6B:
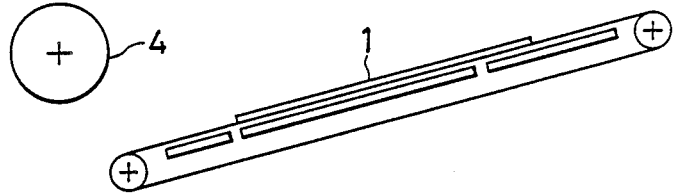
Figure 6C:
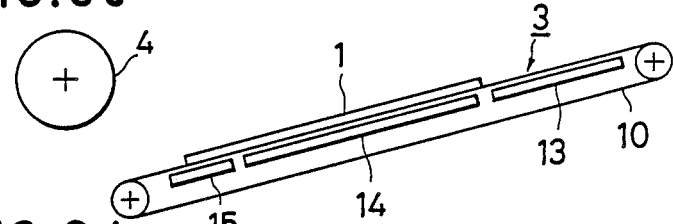

Next, the conveyor belt 10 is moved at a low speed while attracting the belt member 1 thereto, and after the rear end obtuse angle portion sensors 71 and 72 have detected passage of the rear end obtuse angle portion of the belt member 1, the conveyor belt 10 advances by a fixed distance and then stops. Thus, the belt member 1 moves to the rear end reshaping position (FIG. 6b).

At this position, only the rear electromagnet 13 has its excitation weakened to mitigate attraction of the rear end portion of the belt member 1. Then, the rear end shape of the belt member 1 is corrected by the correcting arms 52a and 53a in the above-described manner, the excitation of the electromagnet 13 is strengthened again to attract it to the conveyor belt 10 so that the rear end shape after correction may not deform. The conveyor belt 10 is driven initially at a high speed and thereafter moved at a low speed.

After the front end obtuse angle portion sensors 73 and 74 has detected passage of the front end obtuse angle portion of the belt member 1, the conveyor belt 10 is advanced by a fixed distance and is then stopped (FIG. 6c), then the excitation of the front electromagnet 15 is weakened, and the shape of the front end of the belt member 1 is corrected by the correcting arms 52b and 53b.

Figure 6D:
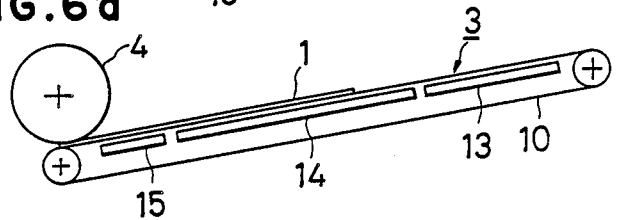

After the excitation of the electromagnet 15 has been again strengthened so that the front end shape after correction may not deform, the entire belt conveyor 3 is advanced by actuating the advancing and retreating cylinder 7, also the conveyor belt 10 is moved until the front end portion of the belt member 1 comes right under the forming drum 4. Subsequently, the conveyor belt 10 is made to swing upwards by actuating the cylinder 8 so that the front end portion of the belt member 1 may be lightly pressed against the forming drum 4 (FIG. 6d).

Figure 6E:
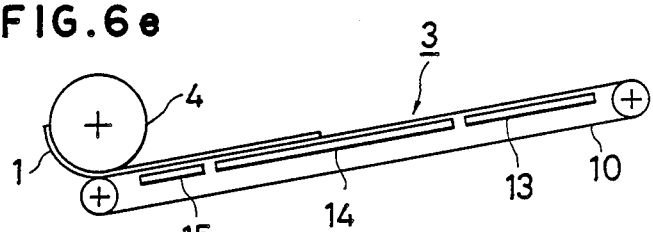

Under the condition that the front end portion of the belt member 1 is kept in press contact with the forming drum 4 in the above-described manner, the forming drum 4 and the conveyor belt 10 are driven at synchronized speeds. That is with the surface velocities of the forming drum 4 and the conveyor belt 10 equalized, and thereby the triangular portion at the front end of the belt member 1 is transferred onto the forming drum 4 (FIG. 6e).

Figure 6F:
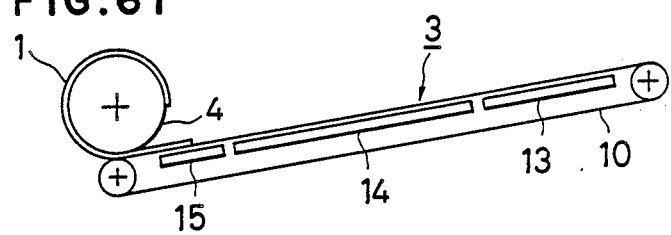

After the transfer of the front end triangular portion of the belt member 1 has been carried out in the above-described manner, the entire circumference of the loop formed by joining the front and rear ends of the belt member 1 is compared with the entire circumference of the forming drum 4. If there is a positive or negative difference therebetween, the belt member 1 is stuck onto the forming drum 4 while compression or extension of the belt member 1 is being performed by changing the speed of the forming drum 4 (FIG. 6f). More particularly, when the belt member 1 is longer than the entire circumference of the forming drum 4, the speed of the forming drum 4 is slowed down. When the belt member is shorter than the entire circumference of the forming drum 4, the speed of the forming drum 4 is raised. Otherwise, the speed of the conveyor belt 10 could be changed. However, in the event that the speeds of the forming drum 4 and the conveyor belt 10 are different, the relative speed therebetween is held constant in time. It is to be noted that in the case of compressing the belt member 1, if the absolute amount of compression is large, slacking and/or creases of the belt member 1 would be generated on the forming drum and the product would become undesirable in quality, and so, it is desirable to preliminarily cut the belt member 1 into a rather short length and to stick it onto the forming drum 4 while being stretched.

Figure 6G:
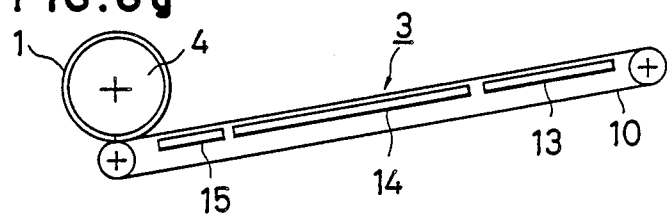
Figure 8A:
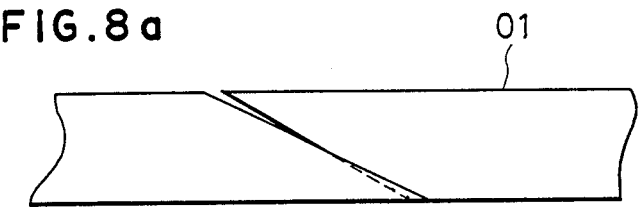
FIGS. 8a to 8e are schematic plan views showing different examples of the case where a front end and a rear end of a belt member do not align with each other.
Figure 8B:
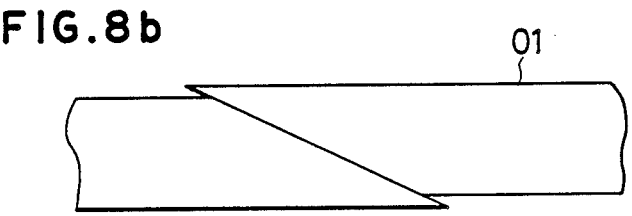
Figure 8C:
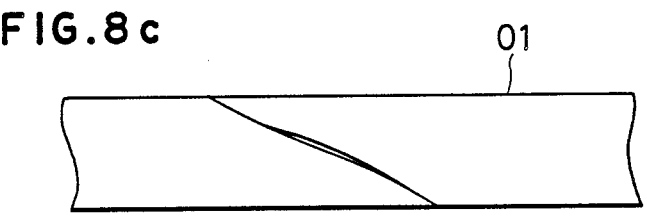
Figure 8D:
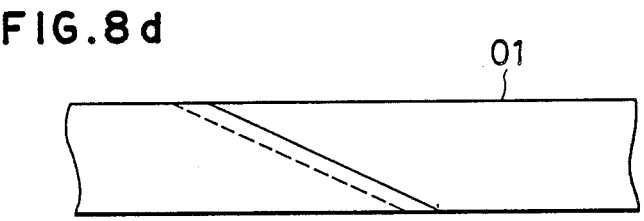
Figure 8E:
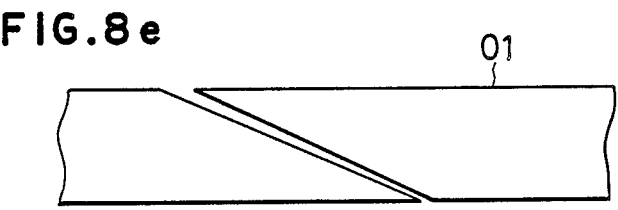

After the belt member 1 has been entirely stuck onto the forming drum 4 except for the rear end triangular portion in the above-described manner, the forming drum 4 and the conveyor belt 10 are driven at the synchronized speed such that the forming drum 4 and the belt member 1 have the same surface speed, and thereby the last rear end triangular portion is stuck (FIG. 6g).

After the belt member 1 has been entirely wrapped around the forming drum 4, the front end of the belt conveyor 3 is lowered by actuating the swinging cylinder 8, and subsequently the belt conveyor 3 retreats by actuating the advancing and retreating cylinder 7 so that the belt conveyor 3 can receive feeding of the next belt member 1 from the fixed length cutting conveyor 2. Under this condition, since no obstacle is present around the forming drum 4, the belt member after joining can be easily taken out of the forming drum 4, and moreover, sticking of a tread or other members also can be performed without any inconvenience.

As described above, according to the present invention, since positioning of a belt member 1, reshaping of the front and rear end and adjustment of a length of a belt member all can be done, when the belt member 1 has been wrapped around the forming drum 4, the front end and the rear end of the belt member 1 can be aligned precisely. In addition, since the above-mentioned steps of the process are all performed automatically, human labor is not necessitated, and thereby production efficiency can be raised.

It is to be noted that while an electromagnet was employed to maintain the shape of the belt member 1 and the excitation of the electromagnet was strengthened or weakened according to necessity in the above-described embodiment, a permanent magnet could be employed therefor and the attracting force could be adjusted by bringing this permanent magnet far from or close to the belt member 1.

In addition, in order to attract the belt member 1 onto the conveyor belt 10, an alternative method in which appropriate holes are formed in the conveyor belt 10 and the belt member 1 is a vacuum applied through these holes, can be conceived. This alternative method is effective, especially in the case where the cords inserted into the belt members 1 are not made of a ferromagnetic material.

While the belt member 1 is adapted to be stuck onto the forming drum 4 from the underside in the above-described embodiment, now another preferred embodiment in which the belt member 1 is adapted to be stuck onto the forming drum 4 from the upperside, will be described with reference to FIG. 7.

A belt conveyor 100 is slidable back and forth between a fixed length cutting conveyor 2 and a forming drum 4, and between the belt conveyor 100 and the forming drum 4 is supported a transfer belt conveyor 91 above them so as to be movable in the vertical direction. On the underside of the upper traveling portion of the belt conveyor 100 are closely disposed electromagnets 93, 94 and 95, and on the upper side of the lower traveling portion of the transfer belt conveyor 91 is closely disposed an electromagnet 97. The belt conveyor 100 is provided with a widthwise positioning mechanism and front and rear end reshaping mechanisms which are similar to those employed in the above-described first preferred embodiment.

First, the belt conveyor 100 is retreated, then the belt member 1 is fed from the conveyor 2 to that belt conveyor 100, on the conveyor belt 92 of the belt conveyor 100, positioning in the widthwise direction and reshaping of the front and rear ends are carried out while appropriately adjusting the excitation of the electromagnets 93, 94 and 96, and then the belt conveyor 100 is advanced.

After the belt member 1 has been moved to the position under the transfer conveyor 91, the transfer conveyor 91 is lowered and the belt member 1 is held between the conveyor belt 96 of the transfer belt conveyor 91 and the conveyor belt 92 of the belt conveyor 100.

Under this condition, the surface speeds of the conveyor belts 92 and 96 and the forming drum 4 are made equal to carry out synchronized operations, and thereby the front end triangular portion of the belt member 1 is stuck onto the forming drum 4.

Thereafter, until the moment just before the rear end triangular portion of the belt member 1 is transferred, the rotational speed of the forming drum 4 is adjusted so as to have a relative speed with respect to the conveyor belt 96, and sticking of the belt member 1 onto the forming drum 4 is effectuated while the belt member is being compressed or expanded.

The last rear end triangular portion is stuck onto the forming drum 4 under the condition where compression or expansion is not effective by synchronously operating the transfer belt conveyor 91 and the forming drum 4 at the same surface speed.

During the period when the belt member 1 is passing the transfer belt conveyor 91, the electromagnet 97 operates to attract the belt member 1 to the conveyor belt 96 so that the shape and the position in the widthwise direction of the belt member 1 may not be changed. By sticking the belt member 1 onto the forming drum 4 in the above-described manner, the front end and the rear end of the belt member 1 can be aligned at a high precision. It is to be noted that after sticking onto the forming drum, by retreating the transfer belt conveyor to the above and the belt conveyor to the rear, extraction after joining and the like of the belt member 1 can be done easily.

What is claimed is:

1. An apparatus for sticking a tire component member having cords inserted therein at a predetermined bias angle and having its opposite ends cut respectively in parallel to said cords into a fixed length, onto a forming drum, comprising:
   a belt conveyor containing attracting means therein for receiving said cut tire component member and conveying it to said forming drum;
   widthwise positioning means for correcting a position in the widthwise direction of said tire component member on said belt conveyor by holding said tire component member from its both lateral sides;
   front end reshaping means adapted to butt against a cut edge surface at the front end of said tire component member on said belt conveyor for correcting the shape of the front cut edge; and
   rear end reshaping means adapted to butt against a cut edge surface at the rear end of said tire component member on said belt conveyor for correcting the shape of the rear cut edge.

2. An apparatus as claimed in claim 1, wherein said attracting means is a magnet disposed contiguously to a conveyor belt of said belt conveyor.

3. an apparatus as claimed in claim 1, wherein said widthwise positioning means comprises a pair of left and right centering bars extending along the opposite sides of a conveyor belt of said belt conveyor and displaceable in the widthwise direction of said conveyor belt.

4. An apparatus as claimed in claim 1, wherein said front end reshaping means comprises a correcting arm having one end pivotably mounted to a side portion of said belt conveyor and adapted to swing by a predetermined angle towards the center line of said belt conveyor so as to butt against a cut edge surface at the front end of said tire component member.

5. An apparatus as claimed in claim 4, wherein said correcting arm is provided in pair consisting of left and right correcting arms.

6. an apparatus as claimed in claim 1, wherein said rear end reshaping means comprises a correcting arm having one end pivotably mounted to a side portion of said belt conveyor and adapted to swing by a predetermined angle towards the center line of said belt conveyor so as to butt against a cut edge surface at the rear end of said tire component member.

7. An apparatus as claimed in claim 6, wherein said correcting arm is provided in pair consisting of left and right correcting arms.

8. An apparatus as claimed in claim 1, wherein said belt conveyor is supported in a vertically swingable manner via a horizontal support shaft extending in the widthwise direction on a base table that is slidable in the back and forth directions.

9. an apparatus as claimed in claim 1, wherein said belt conveyor is made slidable in the back and forth directions so as to move close to or far from said forming drum, and a transfer conveyor is disposed in a vertically displaceable manner at the position above the gap between the front end of said belt conveyor and said forming drum so as to bridge them.

* * * * *